(12) United States Patent
Luo

(10) Patent No.: US 11,151,067 B2
(45) Date of Patent: Oct. 19, 2021

(54) MULTI-CONTROLLER MULTI-MEMORY DEVICE FOR PARALLEL DATA READING AND WRITING

(71) Applicant: Ning Luo, Fuzhou (CN)

(72) Inventor: Ning Luo, Fuzhou (CN)

(73) Assignee: FUZHOU ROCKCHIP ELECTRONICS CO., LTD., Fuzhou (CN)

( * ) Notice: Subject to any disclaimer, the term of this patent is extended or adjusted under 35 U.S.C. 154(b) by 460 days.

(21) Appl. No.: 15/289,937

(22) Filed: Oct. 10, 2016

(65) Prior Publication Data

US 2017/0103030 A1    Apr. 13, 2017

(30) Foreign Application Priority Data

Oct. 8, 2015   (CN) .......................... 201510644606.3

(51) Int. Cl.
*G06F 13/00* (2006.01)
*G06F 13/16* (2006.01)
*G06F 13/18* (2006.01)

(52) U.S. Cl.
CPC .......... *G06F 13/1694* (2013.01); *G06F 13/18* (2013.01)

(58) Field of Classification Search
None
See application file for complete search history.

(56) References Cited

U.S. PATENT DOCUMENTS

| | | | | |
|---|---|---|---|---|
| 4,402,040 A * | 8/1983 | Evett | .................... | G06F 13/374 710/119 |
| 5,566,306 A * | 10/1996 | Ishida | .................... | G06F 13/18 710/27 |
| 6,636,507 B1 * | 10/2003 | Miyoshi | ............. | H04L 12/5601 370/362 |
| 6,789,173 B1 * | 9/2004 | Tanaka | ............... | G06F 12/0813 370/352 |

* cited by examiner

*Primary Examiner* — Reginald G Bragdon
*Assistant Examiner* — Michael L Westbrook

(57) ABSTRACT

A multi-controller multi-memory device is disclosed. The device may include a plurality of controllers and a plurality memory units (m-units). Each controller is connected with a dedicated request-distribution unit (dist-unit) and a dedicated read-selection unit (read-unit). Each m-unit is connected with a dedicated arbitration unit (abt-unit). A controller's dedicated dist-unit is coupled with each of the abt-units dedicated to the plurality of m-units. The controller is configured to transmit a data-request to the controller's dedicated dist-unit, the data-request addressing an m-unit. The controller's dedicated dist-unit is configured to transmit the data-request to an abt-unit dedicated to the m-unit. The abt-unit is configured to select the data-request for transmitting to the m-unit based on an arbitration process.

20 Claims, 3 Drawing Sheets

MULTI-CONTROLLER MULTI-MEMORY DEVICE FOR PARALLEL DATA READING AND WRITING

CROSS-REFERENCE

This application is a US non-provisional application claiming priority to a Chinese Patent Application No. 201510644606.3, filed on Oct. 8, 2015, which is hereby incorporated by reference in its entirety, including any appendices or attachments thereof, for all purposes.

TECHNICAL FIELD

The present disclosure is related to a multi-controller multi-memory device, and methods to utilize the multi-controller multi-memory device for parallel data reading and writing.

BACKGROUND

With the recent technology developments, integrated circuits have been designed with more and more processors. In order to maximize the utilization of these processors, each of these processors may be coupled to a dedicated internal memory (such as cache) to improve data access efficiency. However, in many multi-processor architectures, these processors may need to utilize a common AXI bus in order to read/write data from/to their corresponding internal memory. Thus, this common AXI bus may cause conflicts among concurrent data operations requested by the processors, as only one data operation may access the common AXI bus at any particular time. As a result, the utilizations of the processors may be decreased, while the system bandwidth consumption may be increasing, which may in turn led to increased power consumption.

DETAILED DESCRIPTION

Figure 1:
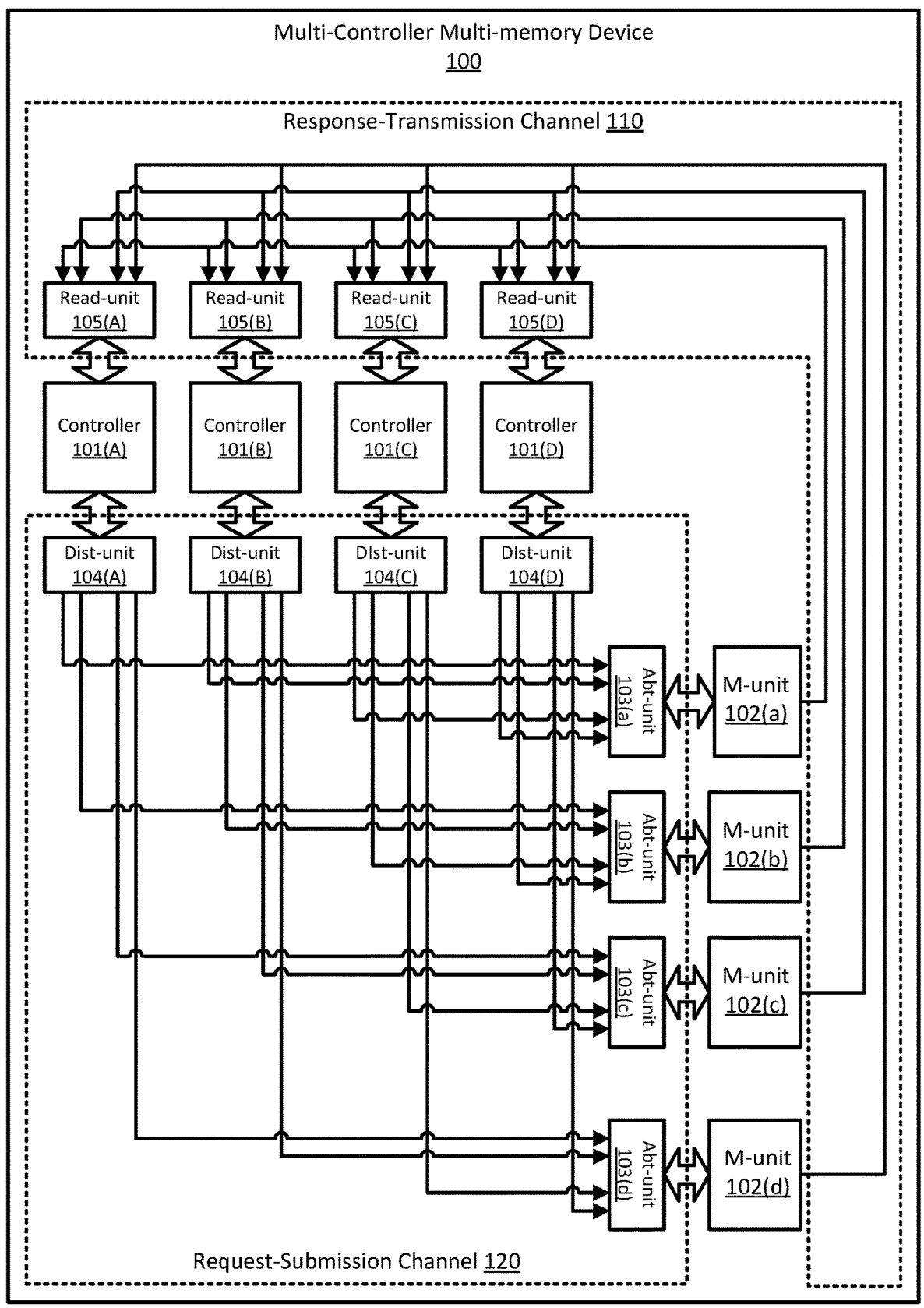
FIG. 1 shows a diagram illustrating a multi-controller multi-memory device configured for parallel data reading and writing.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 shows a diagram illustrating a multi-controller multi-memory device configured for parallel data reading and writing, in according to certain embodiments of the present disclosure. In FIG. 1, the multi-controller multi-memory device 100 may be implemented in a standalone device, or may be designed as a component/module of a computer chip or an electronic circuit. Specifically, the multi-controller multi-memory device 100 may be configured to provide parallel data-reading and data-writing in a System on a Chip (SoC). The multi-controller multi-memory device 100 may also be embedded into any suitable hardware module.

In some embodiments, the multi-controller multi-memory device 100 may be configured with multiple controllers 101 and multiple memory units 102. The multiple controllers 101 and multiple memory units 102 may be interconnected via electrical wirings and circuitry components such as, without limitations, arbitration units 103, request-distribution units 104, and read-selection units 105. For convenience purposes, hereinafter the multi-controller multi-memory device 100 may be referred to as "device" 100; the memory unit 102 may be referred to as "m-unit" 102; the arbitration unit 103 may be referred to as "abt-unit" 103; the request-distribution unit 104 may be referred to as "dist-unit" 104; and the read-selection units 105 may be referred to as "read-unit" 105.

In some embodiments, the controller 101 may be a general-purpose or specialized computing processor having electronic circuitry to perform arithmetical, logical, and input/output operations for the device 100. The controller 101 may be a central processing unit (CPU), a graphics processing unit (GPU), a digital signal processor (DSP), a hardware accelerator, or any microcontroller that can perform data-reading, data-writing, as well as memory-accessing operations. The m-unit 102 may be any memory unit constructed based on volatile memory (e.g., dynamic random-access memory (DRAM) or cache memory) or non-volatile memory (e.g., hard drive or flash memory). Each m-unit 102 may contain storage units configured for data-storing and data-retrieving, and may have a certain amount of storage capacity (e.g., 8 kbytes). In some embodiments, each controller 101 may be a DSP, and each m-unit 102 may be constructed using RAM having read/write speed that matches the processing speed of the DSP.

In some embodiments, one controller 101 may request to store data to, and/or retrieve data from, one or more m-units 102. To allow multiple processors 101 concurrently reading data from, and/or writing data to, a single m-unit 102, the device 100 may utilize a request-submission channel 120 to parallel-transmit data-requests from the controllers 101 to the m-units 102. The device 100 may further utilize a response-transmission channel 110 to parallel-transmit data-responses as well as the requested-data from the m-units 102 to the controllers 101. The number of controllers 110 may or may not be the same as the number of m-units 102. Thus, by utilizing the request-submission channel 120 and the response-transmission channel 110, each controller 101 may be able to concurrently access one, multiple, or all of the m-units 102, and each m-unit 102 may be able to serve one, multiple, or all of the controllers 101.

In some embodiments, the request-submission channel 120 may include a set of dist-units 104 corresponding to the multiple controllers 101, a set of abt-units 103 corresponding to the multiple m-units 102, as well as the dedicated electrical wirings connecting the controllers 101 and the dist-units 104, connecting the dist-units 104 and the abt-units 103, and connecting the abt-units 103 and the m-units

102. By utilizing the request-submission channel 120, data-requests may be transmitted uni-directionally from the controllers 101 to the m-units 102 via the dist-units 104 and the abt-units 103. The response-transmission channel 110 may include a set of read-units 105 corresponding to the multiple controllers 101, as well as the dedicated electrical wirings connecting the multiple m-units 102 and the read-units 105, and connecting the read-units 105 and the controllers 101. By utilizing the response-transmission channel 110, data-responses may be transmitted uni-directionally from the m-units 102 to the controllers 101 via the read-units 105.

In some embodiments, each controller 101 may be configured to create one or more data-requests, and transmit these data-requests to the m-units 102 via the dist-units 104 and the abt-units 103. A "data-request" may be a message containing at least an m-unit address for uniquely identifying a specific m-unit 102 the data-request is directing to. In other words, an "m-unit address" may be a memory address value (e.g., a number or a string) that can be used to locate a corresponding m-unit 102 in the device 100. A "data-request" may be a "read-data-request" or a "write-data-request." The controller 101 may use a "read-data-request" to request for retrieving data stored in a specific m-unit 102. The controller 101 may also use a "write-data-request" to request for writing data into a specific m-unit 102. Besides an m-unit address, the write-data-request may further contain data to be written to the m-unit 102 that is identified by the m-unit address. Thus, the data to be written to the m-unit 102 based on a write-data-request may be referred to as "write-data", and the data retrieved from the m-unit 102 based on a read-data-request may be referred to as "read-data."

In some embodiments, each m-unit 102 may include logics to process data-requests, perform data operations based on the data-requests, and generate data-responses. Upon receiving a data-request, the m-unit 102 may process the data-request, and perform corresponding data operation based on the data-request. In response to a write-data-request, the m-unit 102 may extract the write-data and store the write-data to its own storage units. In response to a read-data-request, the m-unit 102 may retrieve the read-data from its own storage units, and transmit the read-data to the controller 101 via a data-response. A "data-response" may be a message containing at least a "controller address" for uniquely identifying a specific controller 101 which transmitted the data-request the m-unit 102 is responding to. In other words, a controller address may be an address value (e.g., a number or a string) that can be used to locate a corresponding controller 101 in the device 100. Each "data-response" may be a "read-data-response" or a "write-data-response." The m-unit 102 may use a "read-data-response" to transmit read-data to a specific controller 101 in response to its received read-data-request. The m-unit 102 may also use a "write-data-response" to respond to a specific controller 101's write-data-request.

In some embodiments, each controller 101 may be connected with a corresponding dist-unit 104 via dedicated electrical wirings. In other words, each dist-unit 104 is dedicated to serve the corresponding controller 101 it is directly connected with, forming a one-to-one relationship between the dist-unit 104 and its dedicated controller 101. Each controller 101 may also be connected with a corresponding read-unit 105 via dedicated electrical wirings. In other words, each read-unit 105 may be dedicated to serve the corresponding controller 101 it is directly connected with, forming a one-to-one relationship between the read-unit 105 and its dedicated controller 101. Further, each m-unit 102 may be connected to a corresponding abt-unit 103 via dedicated electrical wirings. In other words, each abt-unit 103 may be dedicated to serve the corresponding m-unit 102 it is directly connected with, forming a one-to-one relationship between the abt-unit 103 and its dedicated m-unit 102.

In some embodiments, each dist-unit 104 may have a set of electrical wirings for connecting with each of the abt-units 103 in the device 100. Specifically, each dist-unit 104 may utilize a dedicated electrical wiring to connect to one of the abt-units 103. As a result, each abt-unit 103 may also be connected with each of the dist-units 104. Assuming, there are M number of dist-units 104 and N number of abt-units 103 in the device 100, then there are M*N number of electrical wirings connecting the dist-units 104 with the abt-units 103, each of the M*N number of electrical wirings connecting one specific dist-unit 104 and one specific abt-unit 103. Thus, when a dist-unit 104 transmits data to a specific abt-unit 103, this dist-unit 104 may transmit such data using a dedicated wiring that connects the dist-unit 104 with the specific abt-unit 103. Likewise, when an abt-unit 103 receives data from a specific dist-unit 104, this abt-unit 103 may receive such data using a dedicated wiring that connects the specific dist-unit 104 with the abt-unit 103.

In some embodiments, each m-unit 102 may have a single electrical wiring for concurrently connecting with each of the read-units 105 in the device 100. As a result, each read-unit 105 may also be connected with each of the m-units 102 using different electrical wirings. When one m-unit 102 transmits data to a specific read-unit 105, this m-unit 102 may concurrently transmit such data to all the read-unit 105, since a single wiring is used to connect the m-unit 102 with all the read-units 105. Likewise, when a read-unit 105 receives data from a specific m-unit 102 via a single wiring, other read-units 105 may also receive such data via this single wiring, as this single wiring is used to connect the m-unit 102 with all the read-units 105.

In some embodiments, a dist-unit 104 may be configured to process a data-request received from the controller 101 it is dedicated to, and transmit this data-request to a particular abt-unit 103 based on the data-request. Specifically, the dist-unit 104 may extract the m-unit address contained in the data-request, identify the m-unit 102 based on the m-unit address, and ascertain the specific abt-unit 103 that is dedicated to the m-unit 102. The dist-unit 104 may then transmit the data-request to the specific abt-unit 103 via a dedicated wiring that connects the dist-unit 104 with the specific abt-unit 103. After transmitting the data-request, the dist-unit 104 may proceed to process a subsequent data-request received from the controller 101, without waiting for any responses from the specific abt-unit 103. Thus, the controller 101 may utilize its dedicated dist-unit 104 to quickly transmit one-by-one multiple data-requests intended for multiple m-units 102.

In some embodiments, the abt-unit 103 may be configured to process data-requests received from multiple dist-units 104, and transmit these data-requests to its dedicated m-unit 102 based on an arbitration process. Since an abt-unit 103 may be connected with multiple dist-units 104, this abt-unit 103 may concurrently (or within a short period) receive more than one data-request transmitted from these multiple dist-units 104. Thus, the abt-unit 103 may utilize the arbitration process to arbitrate and choose which order the received data-request shall be transmitted to the m-unit 102 for processing. Before proactively transmitting these data-requests one-by-one to the m-unit 102 for processing, the abt-unit 103 may temporarily store these data-requests in an internal "data-request-list." Alternatively, the abt-unit 103 may await instructions from its dedicated m-unit 102 before transmitting these data-requests to the m-unit 102.

In some embodiments, the abt-unit 103 may perform the "arbitration process" by evaluating the received data-requests based on a priority ranking. Specifically, the abt-unit 103 may select and remove one data-request from the internal data-request-list based on this priority ranking, and transmit this selected data-request to its dedicated m-unit 102 for further processing. After waiting for a certain amount of time (e.g., one clock cycle or a fixed number of clock cycles), the abt-unit 103 may select and remove another data-request from the remaining data-requests in the internal data-request-list based on this priority ranking, and transmit this selected data-request to its dedicated m-unit 102. Any additional data-requests received from dist-unit 104s during the above process may be added to its internal data-request-list.

In some embodiments, the "priority ranking" may be a time-priority ranking of the data-requests received by the abt-unit 103. A "time-priority" ranking may rank the priorities of the data-requests using the timestamps of these data-requests received by the abt-unit 103. In order words, a first data-request may have a higher priority (e.g., an earlier timestamp) than a second data-request when the abt-unit 103 received the first data-request earlier than receiving the second data-request. The abt-unit 103 may sort the priorities for all the data-requests in its internal data-request-list, and choose the data-request having the highest priority (e.g., the earliest timestamp) as the data-request that is selected based on the priority ranking. The selected data-request may then be removed from the internal data-request-list and transmitted to the m-unit 102 for further processing.

In some embodiments, the priority ranking may be a fixed-priority ranking of the data-requests received by the abt-unit 103. A "fixed-priority" indicates that certain controllers 101 may have a higher priority than other controllers 101 in the device 100. For example, the controller 101(A) may have a higher priority than the controller 101(B). In this case, data-requests from the controller 101(A) may have higher priorities than those of data-requests from the controller 101(B). The abt-unit 103 may sort the priorities of all the data-requests in its internal data-request-list based on the priories of the controllers, and choose the data-request having the highest priority (e.g., from the highest priority controller) as the data-request that is selected based on the priority ranking.

In some embodiments, the priority ranking may be a rotating-priority ranking of the data-requests received by the abt-unit 103. A "rotating-priority" indicates that a higher priority may be rotating among the controllers 101. For example, during a first round of processing, the controller 101(A) may be assigned a higher priority than the controller 101(B). During a second round of processing, the higher priority may be rotated from the controller 101(A) and assigned to the controller 101(B), and the controller 101(B) may have a higher priority than the controller 101(A). Afterward, the higher priority may be rotated to another one of the controllers 101 in the device 100. In this case, the abt-unit 103 may sort the priorities of all the data-requests in its internal data-request-list, and choose the data-request having the highest priority (e.g., from the controller currently being assigned with the highest priority) as the data-request that is selected by the priority ranking. During a subsequent round of processing, the abt-unit 103 may choose another data-request having the highest priority (e.g., from a different controller currently being assigned with the highest priority) as the data-request that is selected by the priority ranking.

In some embodiments, the priority ranking may be a weighted-priority ranking of the data-requests received by the abt-unit 103. A "weighted-priority" indicates that a weight value may be taken into consideration when calculating priorities for the data-requests. A "weight value" may be a number (preferably a positive integer) that identifies the priorities of the controllers 101 in the device 100. Thus, each controller 101 may have a corresponding and different weight value. During a first round of processing, the abt-unit 103 may select data-requests from those controllers 101 that have the highest weight value. After the first round of processing, the abt-unit 103 may adjust the weight values of the controllers 101. For example, the abt-unit 103 may reduce the weight value of the controllers 101 that had the highest weight value during the first round of processing, and/or increase the weight values of all the other controllers 101. During a second round of processing, the abt-unit 103 may choose data-requests based on the adjusted weight values of the controllers 101. Such an approach may ensure that the data-requests from different controllers 101 may be processed evenly, without discriminating/penalizing any particular controller 101.

In some embodiments, the m-unit 102 may process the data-requests received from its dedicated abt-unit 103 one-at-a-time. If a data-request is a write-data-request, the m-unit 102 may extract the m-unit address as well as the write-data from the write-data-request, and store the write-data in its internal storage units based on the m-unit address. Afterward, the m-unit 102 may optionally generate a write-data-response indicating whether the write-data-request is processed successfully or not. The m-unit 102 may include the address of the controller 101 which generated the write-data-request into the write-data-response, and transmit this write-data-response to the controller 101 in a manner as described below. Alternatively, the m-unit 102 may generate a write-data-response only when there are errors or exceptions occurring during the processing of the write-data-request.

In some embodiments, the data-request processed by the m-unit 102 may be a read-data-request. In this case, the m-unit 102 may extract the m-unit address from the read-data-request, and retrieve the requested read-data from its internal storage units based on the m-unit address. Afterward, the m-unit 102 may generate a read-data-response indicating whether the read-data-request is processed successfully or not. If the read-data-request is processed successfully, the m-unit 102 may include into the read-data-response the read-data as well as the address of the controller 101 which generated the read-data-request, and transmit this read-data-response to the controller 101 in a manner as described below.

In some embodiments, each m-unit 102 may be constructed using a single-port RAM or a dual-port RAM. When the m-unit 102 is constructed using a single-port RAM, the abt-unit 103 may select and transmit one data-request to the m-unit 102 per arbitration process. When the m-unit 102 is constructed based on a dual-port RAM, the abt-unit 103 may select and transmit two data-requests to the m-unit 102 per arbitration process. In other words, the abt-unit 103 may include dual channels for concurrently transmitting two data-requests to the m-unit 102 via its dual-port, and the m-unit 102 may be configured to concurrently process the two received data-requests at the same time.

In some embodiments, after finishing the corresponding read/write data operation based on the received data-request, the m-unit 102 may concurrently transmit its generated data-response to each of the read-units 105 via its dedicated wiring that connects with these read-units 105. Afterward, the m-unit 102 may request its dedicated abt-unit 103 for additional data-request, and the abt-unit 103 may choose another data-request from its internal data-request-list based on the arbitration process. If no data-request to process, the m-unit 102 may sleep for a fixed amount of time (e.g., a fixed number of clock cycles), and wake-up afterward to request its dedicated abt-unit 103 for additional data-requests. Alternatively, the abt-unit 103 may periodically transmit a new data-request to its dedicated m-unit 102, and the m-unit 102 may wait for its dedicated abt-unit 103 for additional data-requests.

In some embodiments, the read-unit 105 may be configured to process multiple data-responses received from multiple m-units 102, and transmit these data-responses to its dedicated controller 101 based on a selection process. Since a read-unit 105 may be connected with multiple m-units 102, this read-unit 105 may concurrently (or within a short period) receive more than one data-response transmitted from these multiple m-units 102. The read-unit 103 may process these data-responses one-by-one, discard those data-responses that are intended for other controllers 101, and only accept and transmit to its dedicated controller 101 those data-responses that are intended for its dedicated controller 101.

In some embodiments, the read-unit 105 may perform the "selection process" by evaluating the controller addresses stored in the received data-responses. Specifically, the read-unit 105 may select one of the received data-responses, and extract the controller address contained therein. If the extracted controller address is not the address of its dedicated controller 101, the read-unit 105 may discard this data-response, and select another one of the received data-responses for the similar processing. If the extracted controller address is the address of its dedicated controller 101, the read-unit 105 may accept and transmit this data-response to the controller 101 using the dedicated wiring between the read-unit 105 and the controller 101. Afterward, the read-unit 105 may pick yet another one of the received data-responses for the similar processing.

Figure 1's example includes four controllers 101, which may be referred to as controller A, controller B, controller C, and controller D. For convenience purposes, the dist-units 104 that correspond to these controllers 101 may be referred to as dist-unit A, dist-unit B, dist-unit C, and dist-unit D. And the read-units 105 that correspond to these controllers 101 may be referred to as read-unit A, read-unit B, read-unit C, and read-unit D. Likewise, Figure 1's example includes four m-units 102, which may be referred to as m-unit a, m-unit b, m-unit c, and m-unit d. The abt-units 103 that correspond to these m-units 102 may be referred to as abt-unit a, abt-unit b, abt-unit c, and abt-unit d.

In one example, assuming controller A intends to perform data accessing operations on m-unit c and m-unit d. The controller A may transmit a first data-request and a second data-request to dist-unit A. The dist-unit A may first evaluate the first data-request, determine that the first data-request is intended for the m-unit c based on the m-unit address contained therein, and transmit the first data-request to the abt-unit c that is associated with the m-unit c. Afterward, the dist-unit A may evaluate the second data-request, determine that the second data-request is intended for the m-unit d based on the m-unit address contained therein, and transmit the second data-request to the abt-unit d that is associated with the m-unit d.

In one example, assuming controller A and controller B intend to parallel perform data accessing operations on m-unit c. The controller A may transmit a data-request A to dist-unit A, and the controller B may transmit a data-request B to its dist-unit B. The dist-unit A may evaluate the data-request A, determine that this data-request A is intended for the m-unit c based on the m-unit address contained therein, and transmit the data-request A to the abt-unit c that is associated with the m-unit c. Likewise, the dist-unit B may also perform similar operations, and concurrently transmit the data-request B to the abt-unit c. The abt-unit c may perform its arbitration process, and select one of the data-request A and data-request B based on a priority ranking. Assuming the abt-unit c chooses data-request B first, it may store data-request A in its data-request-list, and transmit the data-request B to the m-unit c. Alternatively, if the m-unit c supports dual-port, the abt-unit c may concurrently transmit data-request A and data-request B to the m-unit c.

Following the above example, after processed the data-request A, the m-unit c may generate a data-response A in response to the data-request A, and intend to transmit the data-response A to the controller A. The m-unit c may concurrently transmit the data-response A to each of the read-units 105. For a read-unit 105 that is not read-unit A (e.g., read-unit B, read-unit C, or read-unit D), this read-unit 105 may perform its selection process based on the data-response A, determine that the data-response A is not intended for itself, and discard the data-response A. In comparison, when read-unit A receives the data-response A, it may perform its selection process and determine that the data-response A is intended for itself. In this case, read-unit A may accept the data-response A, and transmit the data-response A to the controller A, as a response to the data-request A.

As shown above, each controller 101 may utilize the request-submission channel 120 to concurrently transmit multiple data-requests to multiple m-units 102. Specifically, the controller 101 may utilize its dedicated dist-unit 104 for transmitting the data-requests. The dedicated dist-unit 104 may in turn utilize the multiple dedicated wirings to concurrently deliver the multiple data-requests to multiple abt-units 103. Each abt-unit 103 may be configured to use an arbitration process to process data-requests concurrently transmitted from multiple controllers 101 and their dedicated dist-units 104. Further, each m-unit 102 may utilize the response-transmission channel 110 to concurrently transmit multiple data-responses to multiple controllers 101.

Thus, the request-submission channel 120 may greatly improve the data-request transmission throughputs, while guaranteeing that data-requests requesting for a single m-unit or different m-units 102 do not conflict with each other. The request-submission channel 120 may allow the m-units 102 to provide higher bandwidth to the controllers 101, thus greatly improving the data access efficiency in the device 100. The m-units 102 may be integrated into a single chip, in order to further reduce hardware footprints and save costs.

Figure 2:
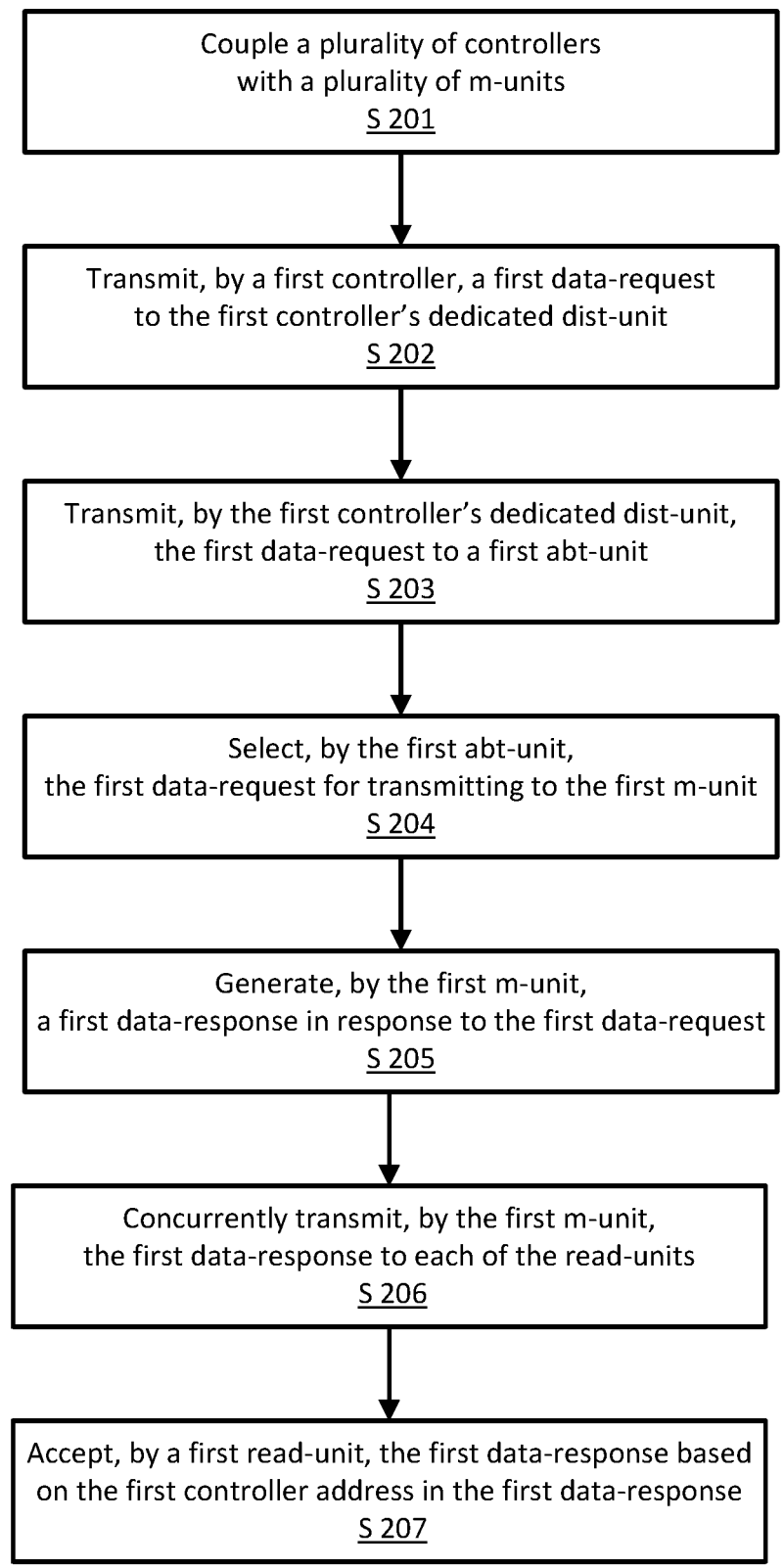
FIG. 2 shows a flow diagram illustrating one process for parallel data reading and writing by a multi-controller multi-memory device.

FIG. 2 shows a flow diagram illustrating one process for parallel data reading and writing by a multi-controller multi-memory device, in accordance to certain embodiments of the present disclosure. The process sets forth various functional blocks or actions (as shown in e.g., S201, S202, S203, S204, S205, S206, and S207) that may be described as processing steps, functional operations, events, and/or acts, which may be performed by hardware, software, and/or firmware. Those skilled in the art in light of the present disclosure will recognize that numerous alternatives to the functional blocks shown in FIG. 2 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block S201, the multi-controller multi-memory device may be configured with a plurality of controllers coupled with a plurality of memory units (m-units). Each of the plurality of controllers may be connected with a dedicated request-distribution unit (dist-unit) and a dedicated read-selection unit (read-unit). Each of the plurality of m-units may be connected with a dedicated arbitration unit (abt-unit).

At block S202, a first controller selected from the plurality of controllers may be configured to transmit a first data-request to the first controller's dedicated dist-unit. The first data-request addresses a first m-unit selected from the plurality of m-units. In other words, the first data-request includes an m-unit address for identifying the first m-unit. The first controller's dedicated dist-unit may be coupled with each of the abt-units dedicated to the plurality of m-units. In some embodiments, the first controller's dedicated dist-unit is configured to transmit the first data-request to the first abt-unit by extracting the m-unit address from the first data-request, and selecting the first abt-unit from the abt-units based on the m-unit address.

At block S203, the first controller's dedicated dist-unit may transmit the first data-request to a first abt-unit selected from the abt-units and dedicated to the first m-unit. In some embodiments, the first controller may be configured to transmit a second data-request to the first controller's dedicated dist-unit. The second data-request addresses a second m-unit selected from the plurality of m-units. In this case, after the transmitting of the first data-request to the first abt-unit, the first controller's dedicated dist-unit may be configured to transmit the second data-request to a second abt-unit selected from the abt-units and dedicated to the second m-unit. Further, the first controller's dedicated dist-unit is configured to transmit the first data-request using a first dedicated wiring connecting with the first abt-unit, and transmit the second data-request using a second dedicated wiring connecting with the second abt-unit.

At block S204, the first abt-unit may select the first data-request for transmitting to the first m-unit based on an arbitration process. Specifically, a second controller selected from the plurality of controllers may transmit a second data-request to the second controller's dedicated dist-unit. The second controller's dedicated dist-unit may be coupled with each of the abt-units. In some embodiments, the second data-request also addresses the first m-unit. Thus, the second controller's dedicated dist-unit may transmit the second data-request to the first abt-unit, concurrent to the first controller's dedicated dist-unit transmitting of the first data-request to the first abt-unit. Based on the arbitration process, the first abt-unit may select the first data-request for transmitting to the first m-unit, and may not select the second data-request for transmitting to the first m-unit.

In some embodiments, the first abt-unit may perform the arbitration process to select the first data-request and not select the second data-request, all based on a priority-ranking of the first data-request and the second data-request. Specifically, the priority-ranking may be a time-priority ranking, a fixed-priority ranking, a rotating-priority ranking, or a weighted-priority ranking.

At block S205, the first m-unit may generate a first data-response in response to the first data-request, and the first data-response may include a first controller address of the first controller.

At S206, the first m-unit may be coupled with each of the read-units dedicated to the plurality of controllers, and the first m-unit may concurrently transmit the first data-response to each of the read-units.

At S207, a first read-unit selected from the read-units and dedicated to the first controller may accept the first data-response based on the first controller address in the first data-response. In the meantime, a second read-unit selected from the read-units and dedicated to a second controller selected from the plurality of controllers may reject the first data-response based on the first controller address in the first data-response.

In some embodiments, the first read-unit may receive a second data-response from a second m-unit selected from the plurality of m-units. The second data-response may include a second controller address of a second controller selected from the plurality of controllers. In this case, the first read-unit may reject the second data-response based on the second controller address in the second data-response.

In some embodiments, the data-request transmitted by the first abt-unit to the first m-unit may be a write-data-request containing write-data. In this case, the first m-unit may store the write-data extracted from the data-request into its own storage.

In some embodiments, the data-request transmitted by the first abt-unit to the first m-unit may be a read-data-request. In this case, the first m-unit may retrieve read-data from its own storage based on the read-data-request, and store the read-data into the data-response. After received the data-response, the first read-unit may transmit the first data-response to the first controller. The first controller may extract the read-data from the data-response.

Figure 3:
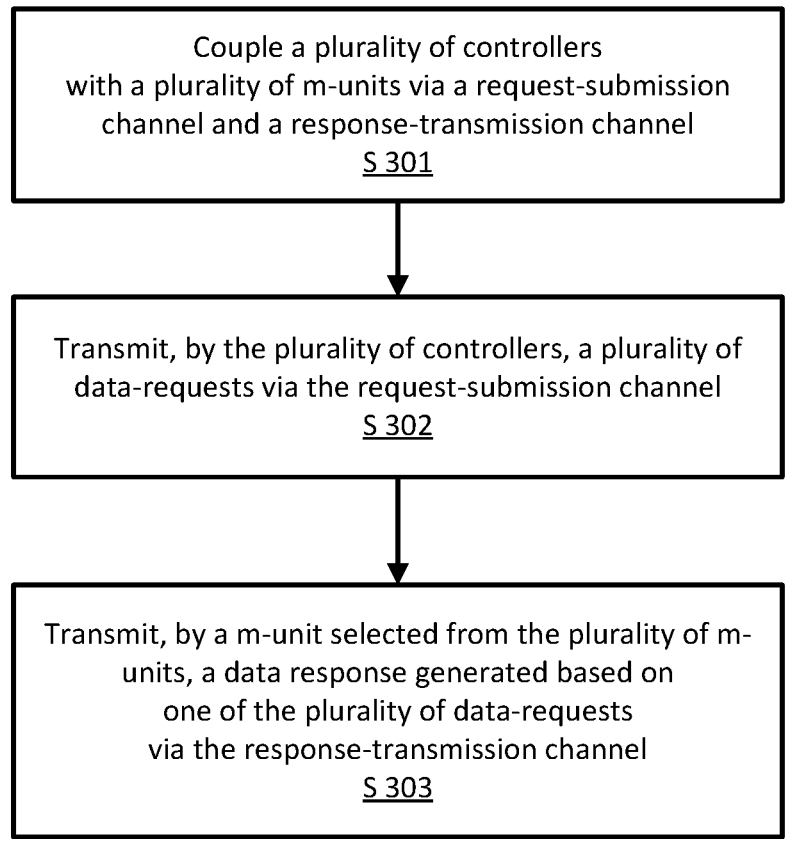
FIG. 3 shows a flow diagram illustrating another process for parallel data reading and writing by a multi-controller multi-memory device; all arranged in accordance to at least one or more embodiments of the present disclosure.

FIG. 3 shows a flow diagram illustrating another process for parallel data reading and writing by a multi-controller multi-memory device, in accordance to certain embodiments of the present disclosure. The process sets forth various functional blocks or actions (as shown in e.g., S301, S302, and S303) that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block S301, the multi-controller multi-memory device may be configured with a plurality of controllers and a plurality of memory units (m-units). The plurality of controllers may be coupled with the plurality of memory units (m-units) via a request-submission channel and a response-transmission channel.

At block S302, the plurality of controllers may transmit a plurality of data-requests via the request-submission channel. Specifically, the plurality of data-requests may be intended for a first m-unit selected from the plurality of m-units, and the request-submission channel is configured to orderly deliver the plurality of data-requests to the first m-unit based on an arbitration process.

In some embodiments, the request-submission channel may include a plurality of request-distribution units (dist-units) each of which is dedicated to a corresponding one of the plurality of controllers. The request-submission channel may further include a plurality of arbitration units (abt-units) each of which is dedicated to a corresponding one of the plurality of m-units. Each of the plurality of dist-units may be connected with all of the plurality of abt-units via a set of dedicated wirings. The plurality of dist-units are configured to concurrently transmit the plurality of data-requests to a first abt-unit selected from the plurality of abt-units and dedicated to the first m-unit. Further, the first abt-unit is configured to process the plurality of data-requests based on the arbitration process.

At block S303, the first m-unit may transmitting, by the m-unit, a data response (which is generated based on one of the plurality of data-requests) via the response-transmission channel. The data response may be intended for a first controller selected from the plurality of controllers, and the response-transmission channel is configured to reject the transmitting of the data-response to those of the plurality of controllers that are not the first controller.

In some embodiments, the response-transmission channel may include a plurality of read-selection units (read-units) each of which is dedicated to a corresponding one of the plurality of controllers. Each of the plurality of m-units may be configured to concurrently transmit the data-response to each of the plurality of read-units. The read-unit selected from the plurality of read-units and is dedicated to the first controller may be configured to accept the transmitting of the data response. Any one of the plurality of read-units that is not dedicated to the first controller may reject the transmitting of the data-response.

Thus, systems and methods for parallel data reading and writing by a multi-controller multi-memory device have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable storage medium refers to any non-transitory data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, modules and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A multi-controller multi-memory device, comprising:
   a uni-directional request-submission channel including a plurality of request-distribution units (dist-units);
   a uni-directional response-transmission channel including a plurality of read-selection units (read-units);
   a plurality of controllers each of which is connected with a dedicated request-distribution unit (dist-unit) in the uni-directional request-submission channel, and a dedicated read-selection unit (read-unit) in the uni-directional response-transmission channel; and
   a plurality memory units (m-units) coupled with the plurality of controllers, wherein the plurality of controllers utilize the dist-units to uni-directionally distribute, via the uni-directional request-submission channel, data-requests to the plurality of m-units and utilize the read-units to uni-directionally receive, via the uni-directional response-transmission channel, from the plurality of m-units data-responses that are generated in response to the data-requests, and each of the plurality of m-units is connected with a dedicated arbitration unit (abt-unit), wherein for a first controller selected from the plurality of controllers,
the first controller's dedicated dist-unit is coupled with each of the abt-units dedicated to the plurality of m-units,
the first controller is configured to transmit a first data-request to the first controller's dedicated dist-unit, the first data-request addressing a first m-unit selected from the plurality of m-units,
the first controller's dedicated dist-unit is configured to transmit the first data-request to a first abt-unit selected from the abt-units and dedicated to the first m-unit, and
the first abt-unit is configured to select the first data-request for transmitting to the first m-unit based on an arbitration process.

2. The multi-controller multi-memory device as recited in claim 1, wherein
the first controller is configured to transmit a second data-request to the first controller's dedicated dist-unit, the second data-request addressing a second m-unit selected from the plurality of m-units,
after the transmitting of the first data-request to the first abt-unit, the first controller's dedicated dist-unit is configured to transmit the second data-request to a second abt-unit selected from the abt-units and dedicated to the second m-unit, and
the first controller's dedicated dist-unit is configured to transmit the first data-request using a first dedicated wiring connecting with the first abt-unit, and transmit the second data-request using a second dedicated wiring connecting with the second abt-unit.

3. The multi-controller multi-memory device as recited in claim 1, wherein the first controller's dedicated dist-unit is configured to transmit the first data-request to the first abt-unit by
extracting a m-unit address from the first data-request, wherein the m-unit address identifies the first m-unit; and
selecting the first abt-unit from the abt-units based on the m-unit address.

4. The multi-controller multi-memory device as recited in claim 1, wherein for a second controller selected from the plurality of controllers,
the second controller's dedicated dist-unit is coupled with each of the abt-units dedicated to the plurality of m-units,
the second controller is configured to transmit a second data-request to the second controller's dedicated dist-unit, the second data-request addressing the first m-unit,
concurrent to the first controller's dedicated dist-unit transmitting the first data-request to the first abt-unit, the second controller's dedicated dist-unit is configured to transmit the second data-request to the first abt-unit, and
the first abt-unit is configured to not select the second data-request for transmitting to the first m-unit based on the arbitration process.

5. The multi-controller multi-memory device as recited in claim 4, wherein the arbitration process's selecting the first data-request and not selecting the second data-request is based on a priority-ranking of the first data-request and the second data-request.

6. The multi-controller multi-memory device as recited in claim 5, wherein the priority-ranking is a time-priority ranking, a fixed-priority ranking, a rotating-priority ranking, or a weighted-priority ranking.

7. The multi-controller multi-memory device as recited in claim 1, wherein
the first m-unit is coupled with each of the read-units dedicated to the plurality of controllers,
the first m-unit is configured to generate a first data-response in response to the first data-request, the first data-response including a controller address of the first controller,
the first m-unit is configured to concurrently transmit the first data-response to each of the read-units, and
a first read-unit selected from the read-units and dedicated to the first controller is configured to accept the first data-response and transmit the first data-response to the first controller based on a selection process.

8. The multi-controller multi-memory device as recited in claim 7, wherein
a second read-unit selected from the read-units and dedicated to a second controller selected from the plurality of controllers is configured to reject the first data-response based on the selection process.

9. The multi-controller multi-memory device as recited in claim 7, wherein the selection process evaluates the controller address in the first data-response with the first controller's address to determine the acceptance of the first data-response, and evaluates the controller address in the first data-response with the second controller's address to determine the rejection of the first data-response.

10. A method for providing parallel data reading and writing by a multi-controller multi-memory device, the method comprising:
coupling a plurality of controllers with a plurality of memory units (m-units), wherein each of the plurality of controllers is connected with a dedicated request-distribution unit (dist-unit) in a uni-directional request-submission channel and a dedicated read-selection unit (read-unit) in a uni-directional response-transmission channel, the plurality of controllers utilize the dist-units to uni-directionally distribute, via the uni-directional request-submission channel, data-requests to the plurality of m-units and utilize the read-units to uni-directionally receive, via the uni-directional response-transmission channel, from the plurality of m-units data-responses that are generated in response to the data-requests, and each of the plurality of m-units is connected with a dedicated arbitration unit (abt-unit);
transmitting, by a first controller selected from the plurality of controllers, a first data-request to the first controller's dedicated dist-unit, wherein the first data-request addresses a first m-unit selected from the plurality of m-units, and the first controller's dedicated dist-unit is coupled with each of the abt-units dedicated to the plurality of m-units;
transmitting, by the first controller's dedicated dist-unit, the first data-request to a first abt-unit selected from the abt-units and dedicated to the first m-unit; and
selecting, by the first abt-unit, the first data-request for transmitting to the first m-unit based on an arbitration process.

11. The method as recited in claim 10, further comprising:
transmitting, by a second controller selected from the plurality of controllers, a second data-request to the second controller's dedicated dist-unit, wherein the second data-request addresses the first m-unit, and the second controller's dedicated dist-unit is coupled with each of the abt-units;
concurrent to the transmitting of the first data-request to the first abt-unit, transmitting, by the second controller's dedicated dist-unit, the second data-request to the first abt-unit; and
not-selecting, by the first abt-unit, the second data-request for transmitting to the first m-unit based on the arbitration process.

12. The method as recited in claim 11, wherein the arbitration process's selecting the first data-request and not selecting the second data-request is based on a priority-ranking of the first data-request and the second data-request.

13. The method as recited in claim 10, wherein the data-request is a write-data-request containing write-data, and the method further comprising:
storing, by the first m-unit, the write-data extracted from the data-request into its own storage.

14. The method as recited in claim 10, further comprising:
generating, by the first m-unit, a first data-response in response to the first data-request, wherein the first m-unit is coupled with each of the read-units dedicated to the plurality of controllers, and the first data-response includes a first controller address of the first controller;
concurrently transmitting, by the first m-unit, the first data-response to each of the read-units; and
accepting, by a first read-unit selected from the read-units and dedicated to the first controller, the first data-response based on the first controller address in the first data-response.

15. The method as recited in claim 14, further comprising:
rejecting, by a second read-unit selected from the read-units and dedicated to a second controller selected from the plurality of controllers, the first data-response based on the first controller address in the first data-response.

16. The method as recited in claim 14, further comprising:
receiving, by the first read-unit, a second data-response from a second m-unit selected from the plurality of m-units, wherein the second data-response includes a second controller address of a second controller selected from the plurality of controllers; and
rejecting, by the first read-unit, the second data-response based on the second controller address in the second data-response.

17. The method as recited in claim 14, wherein the data-request is a read-data-request, and the method further comprising:
retrieving, by the first m-unit, read-data from its own storage based on the read-data-request;
storing, by the first m-unit, the read-data into the data-response;
transmitting, by the first read-unit, the first data-response to the first controller; and
extracting, by the first controller, the read-data from the data-response.

18. A method for providing parallel data reading and writing by a multi-controller multi-memory device, the method comprising:
coupling a plurality of controllers with a plurality of memory units (m-units) via a uni-directional request-submission channel and a uni-directional response-transmission channel, wherein the plurality of controllers utilize the request-submission channel to uni-directionally distribute data-requests to the plurality of m-units and utilize the response-transmission channel to uni-directionally receive from the plurality of m-units data-responses that are generated in response to the data-requests;
transmitting, by the plurality of controllers, a plurality of data-requests via the request-submission channel, wherein the plurality of data-requests are intended for a first m-unit selected from the plurality of m-units, and the request-submission channel is configured to orderly deliver the plurality of data-requests to the first m-unit based on an arbitration process; and
transmitting, by the first m-unit, a data response generated based on one of the plurality of data-requests via the response-transmission channel, wherein the data response is intended for a first controller selected from the plurality of controllers, and the response-transmission channel is configured to reject the transmitting of the data-response to those of the plurality of controllers that are not the first controller.

19. The method as recited in claim 18, wherein
the request-submission channel includes a plurality of request-distribution units (dist-units) each of which is dedicated to a corresponding one of the plurality of controllers, and includes a plurality of arbitration units (abt-units) each of which is dedicated to a corresponding one of the plurality of m-units,
each of the plurality of dist-units is connected with all of the plurality of abt-units via a set of dedicated wirings,
the plurality of dist-units are configured to concurrently transmit the plurality of data-requests to a first abt-unit selected from the plurality of abt-units and dedicated to the first m-unit, and
the first abt-unit is configured to process the plurality of data-requests based on the arbitration process.

20. The method as recited in claim 18, wherein
the response-transmission channel includes a plurality of read-selection units (read-units) each of which is dedicated to a corresponding one of the plurality of controllers,
each of the plurality of m-units is configured to concurrently transmit the data-response to each of the plurality of read-units, and
a read-unit selected from the plurality of read-units and dedicated to the first controller is configured to accept the transmitting of the data response, and any one of the plurality of read-units that is not dedicated to the first controller is configured to reject the transmitting of the data-response.

* * * * *